US012518061B2

(12) United States Patent
Ponnuru et al.

(10) Patent No.: US 12,518,061 B2
(45) Date of Patent: Jan. 6, 2026

(54) MULTI-TENANT TEE ATTESTED RESOURCE PROVISIONING

(71) Applicant: Dell Products L.P., Round Rock, TX (US)

(72) Inventors: Viswanath Ponnuru, Bangalore (IN); Vinay Sawal, Fremont, CA (US); Sumanth Vidyadhara, Bangalore (IN); Judith A. Furlong, Natick, MA (US)

(73) Assignee: Dell Products L.P., Round Rock, TX (US)

( * ) Notice: Subject to any disclaimer, the term of this patent is extended or adjusted under 35 U.S.C. 154(b) by 190 days.

(21) Appl. No.: 18/417,330

(22) Filed: Jan. 19, 2024

(65) Prior Publication Data

US 2025/0238554 A1 Jul. 24, 2025

(51) Int. Cl.
*G06F 21/64* (2013.01)
*G06F 21/44* (2013.01)
*G06F 21/57* (2013.01)

(52) U.S. Cl.
CPC ............ *G06F 21/645* (2013.01); *G06F 21/44* (2013.01); *G06F 21/57* (2013.01)

(58) Field of Classification Search
CPC ......... G06F 21/645; G06F 21/44; G06F 21/57

USPC .......................................................... 713/176
See application file for complete search history.

(56) References Cited

U.S. PATENT DOCUMENTS

| | | | |
|---|---|---|---|
| 2019/0149342 A1* | 5/2019 | Fynaardt | H04L 63/20 713/156 |
| 2021/0243246 A1* | 8/2021 | Patel | H04W 24/10 |
| 2022/0038449 A1* | 2/2022 | Tripp | H04L 67/02 |
| 2022/0417240 A1* | 12/2022 | Zhang | H04L 41/0895 |
| 2023/0074475 A1* | 3/2023 | Mullins | G06F 21/53 |
| 2023/0266957 A1* | 8/2023 | Ren | G06F 8/65 717/169 |
| 2024/0080277 A1* | 3/2024 | Lee | H04L 67/60 |
| 2024/0291815 A1* | 8/2024 | Pascual | H04L 63/0435 |

* cited by examiner

*Primary Examiner* — Michael S McNally
(74) *Attorney, Agent, or Firm* — Workman Nydegger

(57) ABSTRACT

One example method includes receiving, from a prospective tenant, a request to join a tenant cluster of a cloud computing environment, sending a request to verify an authenticity of the prospective tenant, a tenant membership policy applicable to the prospective tenant, and a trusted execution environment (TEE) remote attestation, checking the authenticity and TEE remote attestation against the tenant membership policy, and when the authenticity and TEE remote attestation against the tenant membership policy are verified as indicative of a compliance of the prospective tenant, adding the prospective tenant to the tenant cluster.

20 Claims, 4 Drawing Sheets

MULTI-TENANT TEE ATTESTED RESOURCE PROVISIONING

FIELD OF THE INVENTION

Embodiments of the present invention generally relate to execution environments of cloud computing site tenants. More particularly, at least some embodiments of the invention relate to systems, hardware, software, computer-readable media, and methods, for enabling a cloud tenant to ensure the security of its cloud execution environment and resources.

BACKGROUND

Cloud tenants seek confidentiality of their digital assets when operating in a hosted cloud environment. Thus, confidential computing (CC) approaches may be used to enable cloud clients to create trusted execution environments, in the cloud environment, whose contents are cryptographically protected by hardware. Remote attestation procedures may be used to validate the integrity of this hardware and other physical systems.

However, it is currently impossible for a tenant to certify in a reliable and secure way that the cluster environment, of which the tenant may be a member, has not been corrupted. For example, a tenant typically has no visibility into processes to protect and restrict access to the tenant cluster facility. Nor does the tenant have assurance that the cluster environment has adopted strict accountability and auditability procedures with respect to the critical tenant infrastructure.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
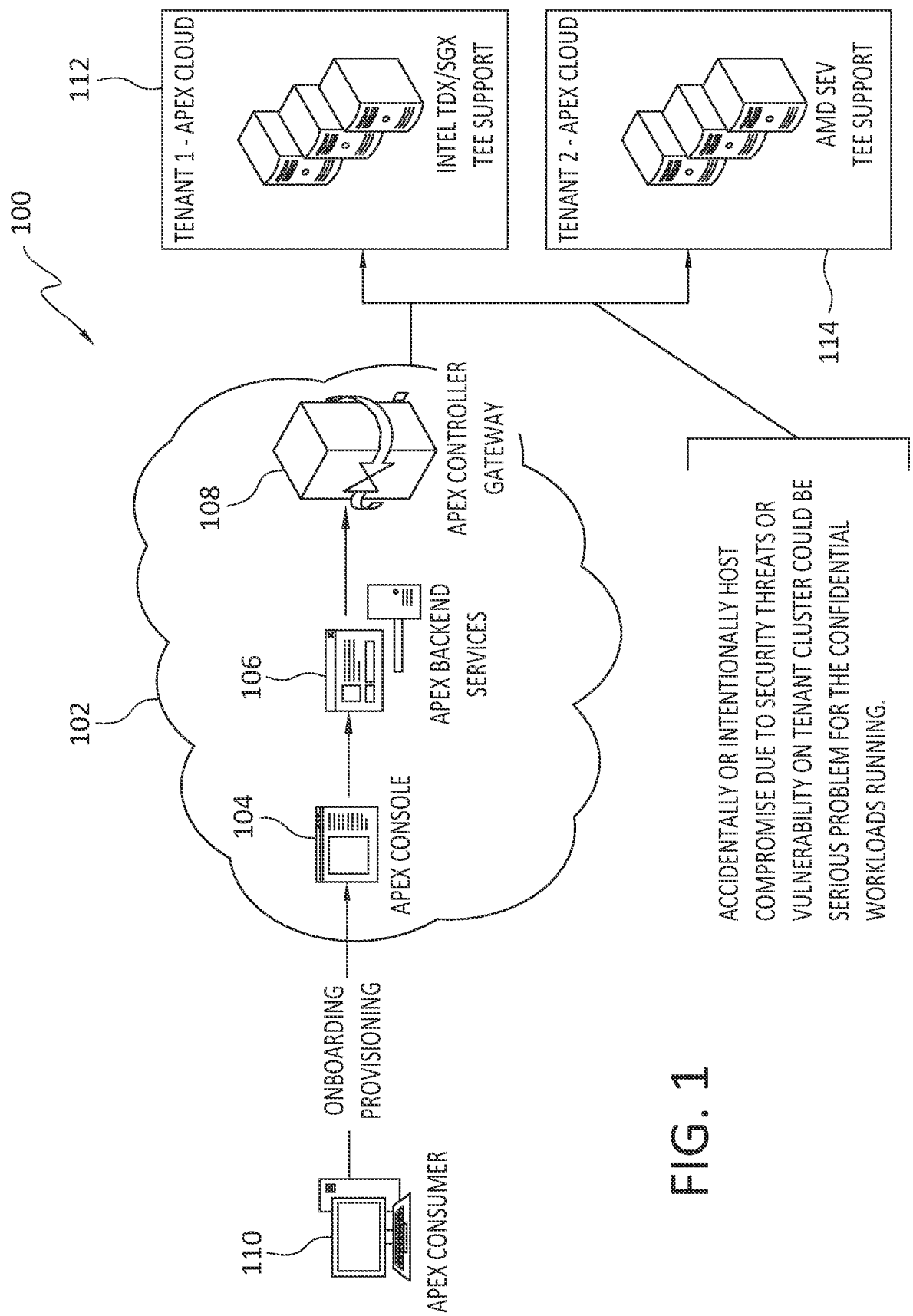
FIG. 1 discloses a configuration in which security problems may arise.

Embodiments of the present invention generally relate to execution environments of cloud computing site tenants. More particularly, at least some embodiments of the invention relate to systems, hardware, software, computer-readable media, and methods, that may enable a cloud tenant to ensure the security of its cloud execution environment and resources.

One example embodiment comprises a method that may include various operations. Such operations may comprise, for example: [1] initiating resource provisioning of a tenant cluster, where the tenant cluster may be provisioned using various certified devices such as compute devices and TEE (trusted execution environment) provider installations; [2] initiating, by a tenant cluster node, a cluster node participation node join request; [3] sending, by a cloud controller master, a verification message to a cluster membership policy manager, to verify the authenticity of the devices of the tenant cluster, tenant membership policies, and TEE remote attestations; and [4] verifying device trust and TEE attestation reports against tenant membership policies and, upon successful verification, joining the cluster node to the tenant cluster. Non-compliant tenant devices may be rejected, and reported.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that a cloud tenant operating in a hosted cloud environment may obtain assurance as to the security of its digital assets. An embodiment may prevent unauthorized participation in a cluster environment of a cloud site. An embodiment may help to ensure that only authenticated devices and entities participate in a cluster environment. Various other advantages of one or more example embodiments will be apparent from this disclosure.

A. Context for an Example Embodiment

With particular attention to FIG. 1, one example of an operating environment for embodiments of the invention is denoted generally at 100. This hypothetical example illustrates some potential concerns to which one or more embodiments may be directed.

The example environment 100 may comprise a cloud computing environment 102, such as a Dell APEX compute environment of a Dell APEX private cloud environment, for example. Where the cloud computing environment 102 comprises a Dell APEX configuration, the cloud computing environment 102 may comprise a Dell APEX cloud console 104 that comprises a cloud management platform enabling users to access and control their cloud resources, APEX backend services 106 such as data backup services or computing services, and an APEX controller gateway 108 that may control access, by prospective tenants, to a tenant cluster in the cloud computing environment 102. As shown in FIG. 1, the Dell APEX cloud console 104 may handle the onboarding of a customer, or tenant, such as an APEX consumer 110 for example.

As further indicated in the example of FIG. 1, the cloud computing environment 102 may host various tenants 112 and 114 that may be members of a tenant cluster. However, in this configuration, it is possible that whether by occurring by accident, or intentionally, a problem with the tenant 112 for example, and/or a problem elsewhere in the cloud computing environment 102, may compromise the hardware and operations of a legitimate tenant in the cluster, such as the tenant 114.

Thus, an example embodiment comprises an approach to strengthen the trust of the tenants by providing, possibly provided in the form of software-as-a-Service (Saas), a security mechanism and associated method. Such an embodiment may be implemented in various environments such as, but not limited to, the example cloud computing environment 102.

B. Discussion of Aspects of an Example Embodiment

One example embodiment comprises multi-cloud cluster membership resource provisioning policies for tenant cluster in order to prevent unauthorized TEE provider resource participation and to facilitate tenant cluster compliance. One embodiment may be implemented in a Dell APEX environment, but that is not required.

An example embodiment may comprise various useful features. For example, an embodiment may define and use as tenant-specific cluster membership security policy to restrict hardware access by issuing unique identity information for a device such as, for example, comprises a device certificate, and associated TEE attestation certificate. In an embodiment, the device certificate may take the form of a Dell PowerEdge device certificate, but that is not required. As another example, an embodiment may define and implement a cloud attestation trusted framework which may be integrated to containerized workload management system control plane for cluster resource onboarding, so as to prevent unauthorized node or TEE hardware claims, in automated and scalable method. In an embodiment, the framework may comprise a Dell APEX cloud attestation trusted framework, and the containerized workload management system may comprise Kubernetes, but neither of these specific implementations is required. In an embodiment, a cloud membership policy, such as a Dell APEX cloud membership policy for example, may provide more confidence to a tenant by implementing and enforcing security policies to restrict hardware access, and to adopt strict accountability and auditable procedures.

Figure 2:
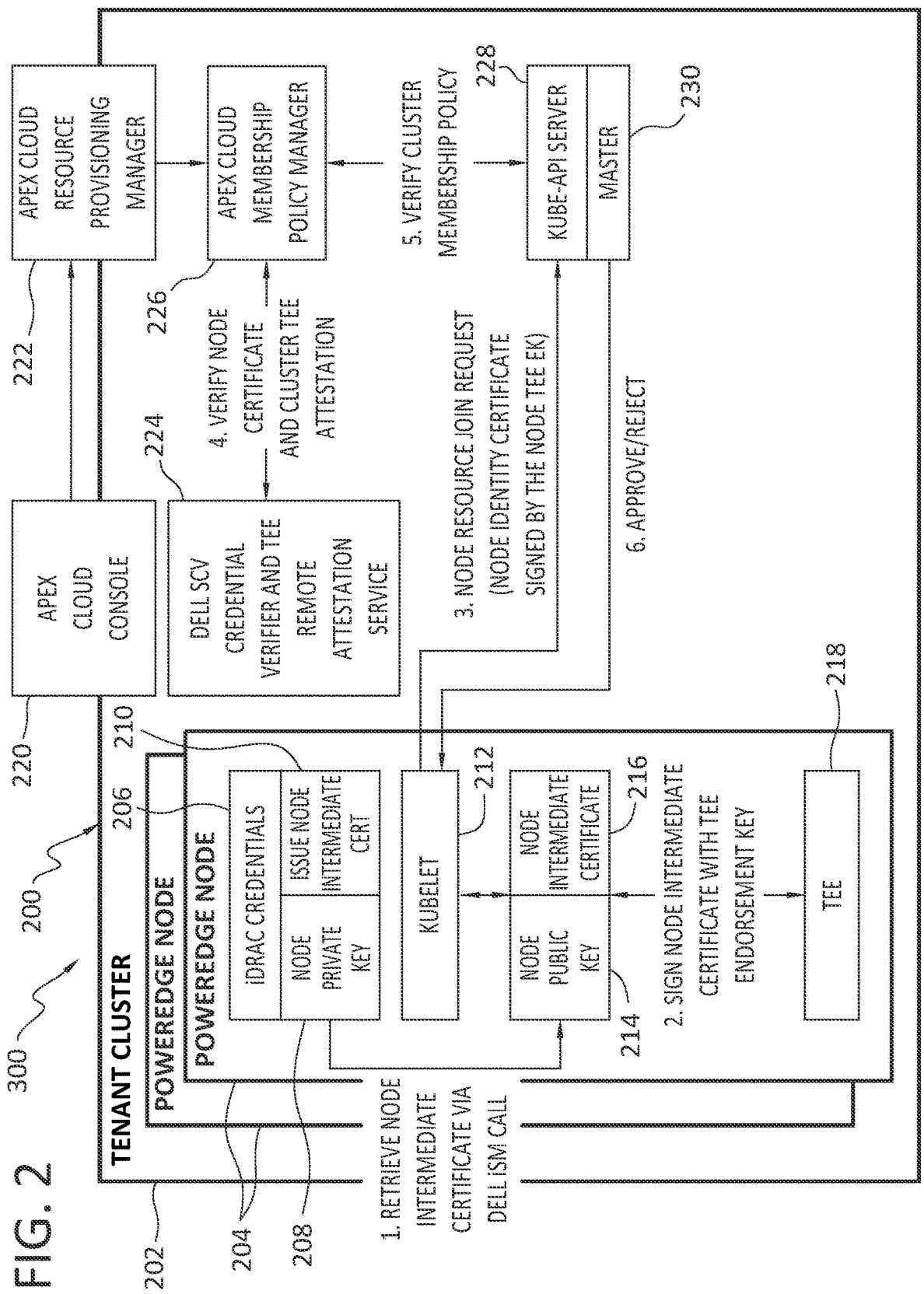
FIG. 2 discloses aspects of a cluster resource provisioning approach according to an embodiment.

With reference now to FIG. 2, an example architecture 200 and method 300 are disclosed that comprise various of the aspects discussed above. In the example of FIG. 2, an embodiment is implemented in connection with Dell APEX components and environments, and a Kubernetes platform although, as noted earlier, neither of these are required in any embodiment. More particularly, FIG. 2 discloses a method 300 for cluster resource provisioning based on a trusted cloud tenant policy.

With reference first to the architecture 200, a tenant cluster 202 may be provided that includes various tenants 204, or 'nodes,' such as Dell PowerEdge nodes for example. Each of the tenants 204 may comprise various elements. In the illustrative, but non-limiting, case of a Dell PowerEdge node, the tenants 204 may each comprise: IDRAC credentials (integrated Dell remote access controller) 206; a node private key 208 that is unique to the tenant 204; a module 210 configured to issue a node intermediate certificate; an agent or program 212, such as a Kubelet for example, that may control communications between a control plane, such as a Kubernetes control plane comprising programs that control operation of Kubernetes, and nodes where a workload of the tenant 204 runs; a node public key 214; a node intermediate certificate 216; and a TEE 218.

With continued reference to the example of FIG. 1, the example architecture 200 may further comprise a Dell APEX cloud console 220, or similar, along with a Dell APEX cloud resources provisioning manager 222, or similar. Further example components of the architecture 200 may comprise a credential verifier 224, such as the Dell SCV credential verifier and TEE remote attestation service, a policy manager 226, such as the Dell APEX cloud membership policy manager, and a Kube-API server 228, or similar, and a cloud controller master 230.

With attention now to the example method 300 disclosed in FIG. 2, the method 300 may begin with retrieval (1) of the node intermediate certificate 210, such as by way of a Dell iSM call for example. The node intermediate certificate 210 may then be signed (2) with a TEE 218 endorsement key. Next, a node resource join request, that is, a node identity certificate signed by the node TEE 218, may be transmitted (3) from the Kubelet 212 to the Kube-API server 228.

Possibly at the same time as, or overlapping with, (3), the credential verifier 224 and the policy manager 226 may cooperate with each other to verify (4) the node certificate and cluster TEE attestation. Next, the policy manager 226 and the Kube-API server 228 may cooperate to verify (5) the cluster membership policy. Finally, the cloud controller master 230 may receive the results of (5) from the Kube-API server 228 and, correspondingly, then transmit (6) to the Kubelet 212 an indication as to whether or not the request to add hardware to the tenant cluster has been approved.

C. Example Methods

Figure 3:
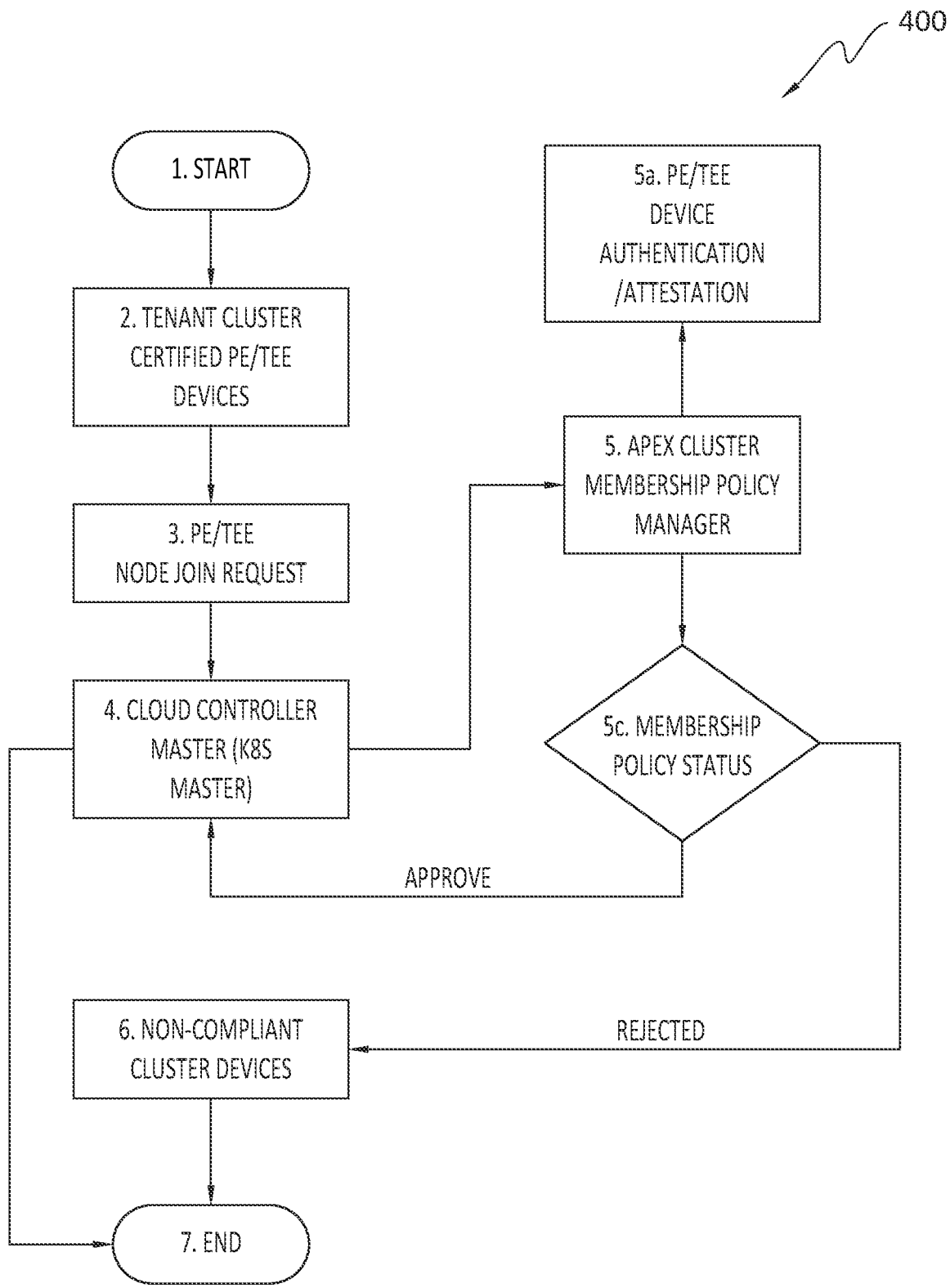
FIG. 3 discloses a method according to an embodiment.

It is noted with respect to the disclosed methods, including the example methods of FIGS. 2 and 3, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 3, a further method 400 according to one example embodiment is disclosed. In an embodiment, part, or all, of the method 400 may be performed, possibly as-a-Service (aaS), in, and by, a cloud computing environment.

In general, the example method 400 may comprise a two part process. In the first part, a cloud resource onboarding service, such as Dell APEX for example, may dynamically provision a cluster membership node certificate to certify the participation of a requesting device in a cluster. In the second part of this example method 400, a resource membership verification process may be performed that seamlessly integrates with any cloud orchestration layer such as, for example, a Kubernetes cluster node provisioning at runtime.

The example method 400 may begin (1) when a tenant cluster resource provision is initiated by a cloud manager, such as the APEX cloud manager. The tenant cluster may be expected to have, and may have done, pre-provisioned (2) a certified list of devices includes compute and supported TEE provider installations. Next, the cluster node participation node join request may be initiated (3) by the tenant cluster node(s).

A cloud controller master, such as a Kubernetes master for example, may receive the resource join request, and then send (4) a verification message to the APEX cluster membership policy manager to verify (5) the device authenticity, membership policies and TEE remote attestations. A device authentication and attestation process begins to verify (5a) the device trust and TEE attestation reports to check against the tenant membership policies. The membership policy status will be returned to the cloud controller manager. There, the devices are checked (5c) and verified against trusted policies, and the requesting nodes will be joined if the policy status is approved.

Any devices determined (5c) to be non-compliant are rejected and placed (6) in a non-compliant cluster devices list for further investigation, audit and compliance report purposes. The tenant cluster resource provision ends (7) as per the APEX cluster membership policies and assures only trusted/authenticated device participations in a cluster.

D. Further Discussion

As apparent from this disclosure, example embodiments may possess various useful features and aspects, although no embodiment is required to possess any of such useful features and aspects. The following are provided by way of example. An embodiment may provide APEX cloud-controlled cluster level TEE remote attestation membership policies to prevent unauthorized device(s) participation in a node cluster. As another example, an embodiment may provide APEX cloud cluster resource provisioning membership policies and criterion based on resource participations using authenticated and trust metrics.

E. Further Example Embodiments

Following are some further example embodiments of the invention. These are presented only by way of example and are not intended to limit the scope of the invention in any way.

Embodiment 1. A method, comprising: receiving, from a prospective tenant, a request to join a tenant cluster of a cloud computing environment; sending a request to verify an authenticity of the prospective tenant, a tenant membership policy applicable to the prospective tenant, and a trusted execution environment (TEE) remote attestation; checking the authenticity and TEE remote attestation against the tenant membership policy; and when the authenticity and TEE remote attestation against the tenant membership policy are verified as indicative of a compliance of the prospective tenant, adding the prospective tenant to the tenant cluster.

Embodiment 2. The method as recited in any preceding embodiment, wherein the prospective tenant comprises a hardware device.

Embodiment 3. The method as recited in any preceding embodiment, wherein the receiving, the sending, the checking, and the adding, are performed in a cloud computing environment.

Embodiment 4. The method as recited in any preceding embodiment, wherein the tenant cluster is associated with a pre-provisioned certified list of devices.

Embodiment 5. The method as recited in any preceding embodiment, wherein when the tenant authenticity and TEE remote attestation against the tenant membership policy are determined to be indicative of non-compliance of the prospective tenant, the prospective tenant is rejected.

Embodiment 6. The method as recited in embodiment 5, wherein the prospective tenant that was rejected is added to a list of devices concerning which one or more of a further investigation, audit, and/or compliance reporting process, is performed.

Embodiment 7. The method as recited in any preceding embodiment, wherein verification of the prospective tenant is performed using a node private key, a node public key, and node intermediate certificate.

Embodiment 8. The method as recited in embodiment 7, wherein the node certificate and TEE remote attestation are cooperatively verified by a credential verifier and a cloud membership policy manager.

Embodiment 9. The method as recited in embodiment 8, wherein the cloud membership policy manager communicates with a cloud resource provisioning manager to obtain information for verification of the node certificate and TEE remote attestation.

Embodiment 10. The method as recited in embodiment 8, wherein the cloud membership policy manager communicates with an application program interface (API) server to verify the tenant membership policy.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
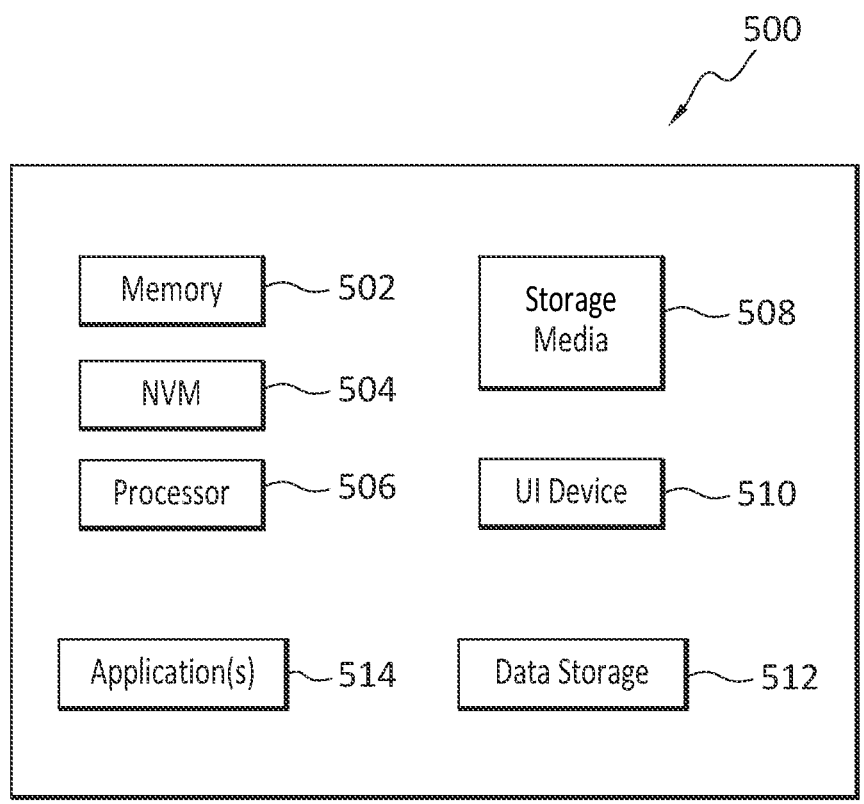
FIG. 4 discloses a computing entity configured and operable to perform any of the disclosed methods, processes, and operations.

With reference briefly now to FIG. 4, any one or more of the entities disclosed, or implied, by FIGS. 1-3, and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 4.

In the example of FIG. 4, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving, from a prospective tenant, a request to join a tenant cluster of a cloud computing environment;
   sending a request to verify an authenticity of the prospective tenant, a tenant membership policy applicable to the prospective tenant, and a trusted execution environment (TEE) remote attestation;
   checking the authenticity and TEE remote attestation against the tenant membership policy; and
   when the authenticity and TEE remote attestation against the tenant membership policy are verified as indicative of a compliance of the prospective tenant, adding the prospective tenant to the tenant cluster.

2. The method as recited in claim 1, wherein the prospective tenant comprises a hardware device.

3. The method as recited in claim 1, wherein the receiving, the sending, the checking, and the adding, are performed in a cloud computing environment.

4. The method as recited in claim 1, wherein the tenant cluster is associated with a pre-provisioned certified list of devices.

5. The method as recited in claim 1, wherein when the tenant authenticity and TEE remote attestation against the tenant membership policy are determined to be indicative of non-compliance of the prospective tenant, the prospective tenant is rejected.

6. The method as recited in claim 5, wherein the prospective tenant that was rejected is added to a list of devices concerning which one or more of a further investigation, audit, and/or compliance reporting process, is performed.

7. The method as recited in claim 1, wherein verification of the prospective tenant is performed using a node private key, a node public key, and node intermediate certificate.

8. The method as recited in claim 7, wherein the node certificate and TEE remote attestation are cooperatively verified by a credential verifier and a cloud membership policy manager.

9. The method as recited in claim 8, wherein the cloud membership policy manager communicates with a cloud resource provisioning manager to obtain information for verification of the node certificate and TEE remote attestation.

10. The method as recited in claim 8, wherein the cloud membership policy manager communicates with an application program interface (API) server to verify the tenant membership policy.

11. A non-transitory storage medium having stored therein instructions that are executable by one or more hardware processors to perform operations comprising:

receiving, from a prospective tenant, a request to join a tenant cluster of a cloud computing environment;

sending a request to verify an authenticity of the prospective tenant, a tenant membership policy applicable to the prospective tenant, and a trusted execution environment (TEE) remote attestation;

checking the authenticity and TEE remote attestation against the tenant membership policy; and when the authenticity and TEE remote attestation against the tenant membership policy are verified as indicative of a compliance of the prospective tenant, adding the prospective tenant to the tenant cluster.

12. The non-transitory storage medium as recited in claim 11, wherein the prospective tenant comprises a hardware device.

13. The non-transitory storage medium as recited in claim 11, wherein the receiving, the sending, the checking, and the adding, are performed in a cloud computing environment.

14. The non-transitory storage medium as recited in claim 11, wherein the tenant cluster is associated with a pre-provisioned certified list of devices.

15. The non-transitory storage medium as recited in claim 11, wherein when the tenant authenticity and TEE remote attestation against the tenant membership policy are determined to be indicative of non-compliance of the prospective tenant, the prospective tenant is rejected.

16. The non-transitory storage medium as recited in claim 15, wherein the prospective tenant that was rejected is added to a list of devices concerning which one or more of a further investigation, audit, and/or compliance reporting process, is performed.

17. The non-transitory storage medium as recited in claim 11, wherein verification of the prospective tenant is performed using a node private key, a node public key, and node intermediate certificate.

18. The non-transitory storage medium as recited in claim 17, wherein the node certificate and TEE remote attestation are cooperatively verified by a credential verifier and a cloud membership policy manager.

19. The non-transitory storage medium as recited in claim 18, wherein the cloud membership policy manager communicates with a cloud resource provisioning manager to obtain information for verification of the node certificate and TEE remote attestation.

20. The non-transitory storage medium as recited in claim 18, wherein the cloud membership policy manager communicates with an application program interface (API) server to verify the tenant membership policy.

* * * * *